(No Model.) 9 Sheets—Sheet 5.
J. V. GANE.
APPARATUS FOR INSERTING AND FIXING THE BRISTLES OF BRUSHES, &c.
No. 378,130. Patented Feb. 21, 1888.
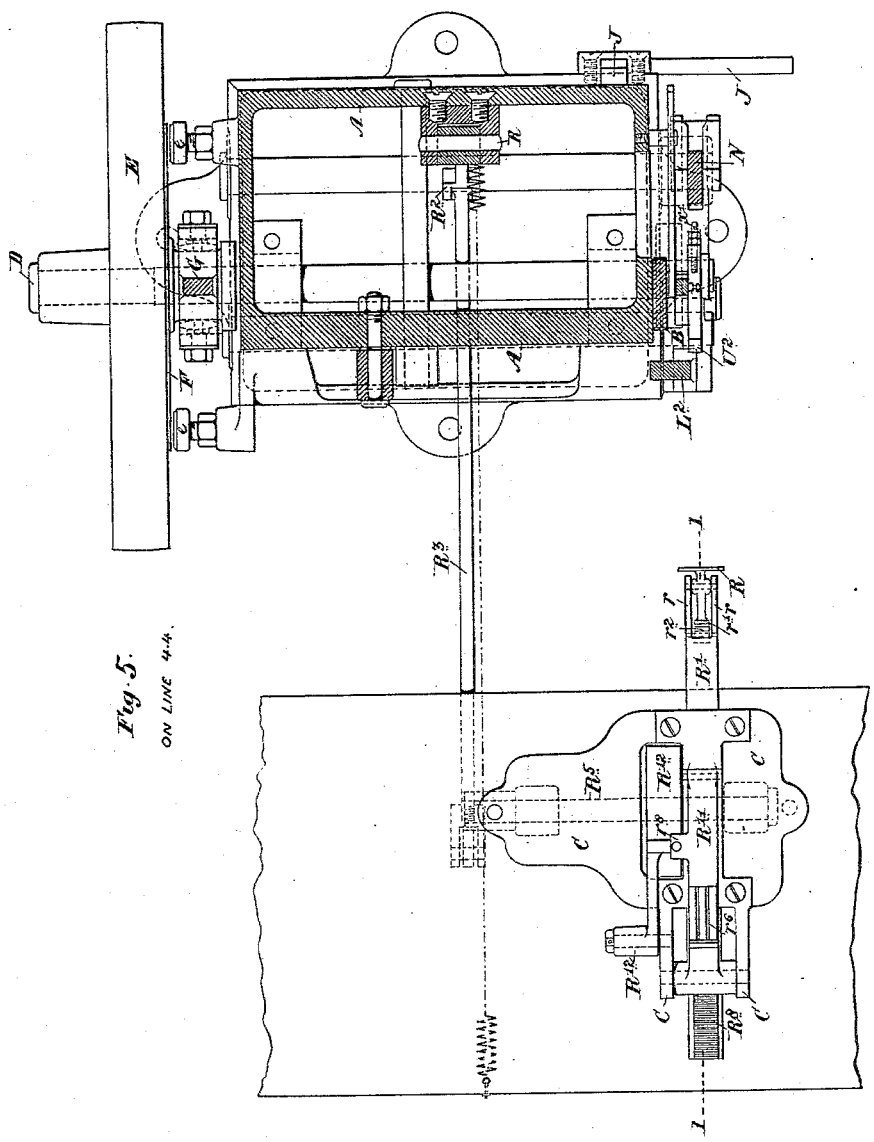
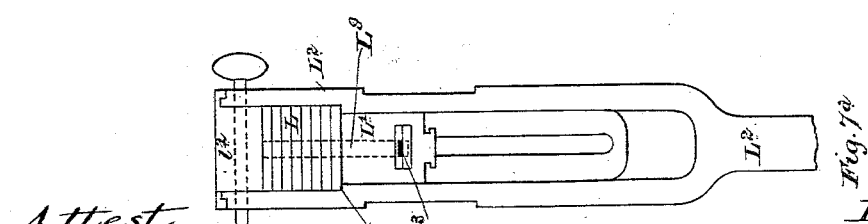
Attest:
William H. Shipley.
N. R. Kennedy.
Inventor,
Jean Victor Gane.
by Phil. T. Dodge.
atty.

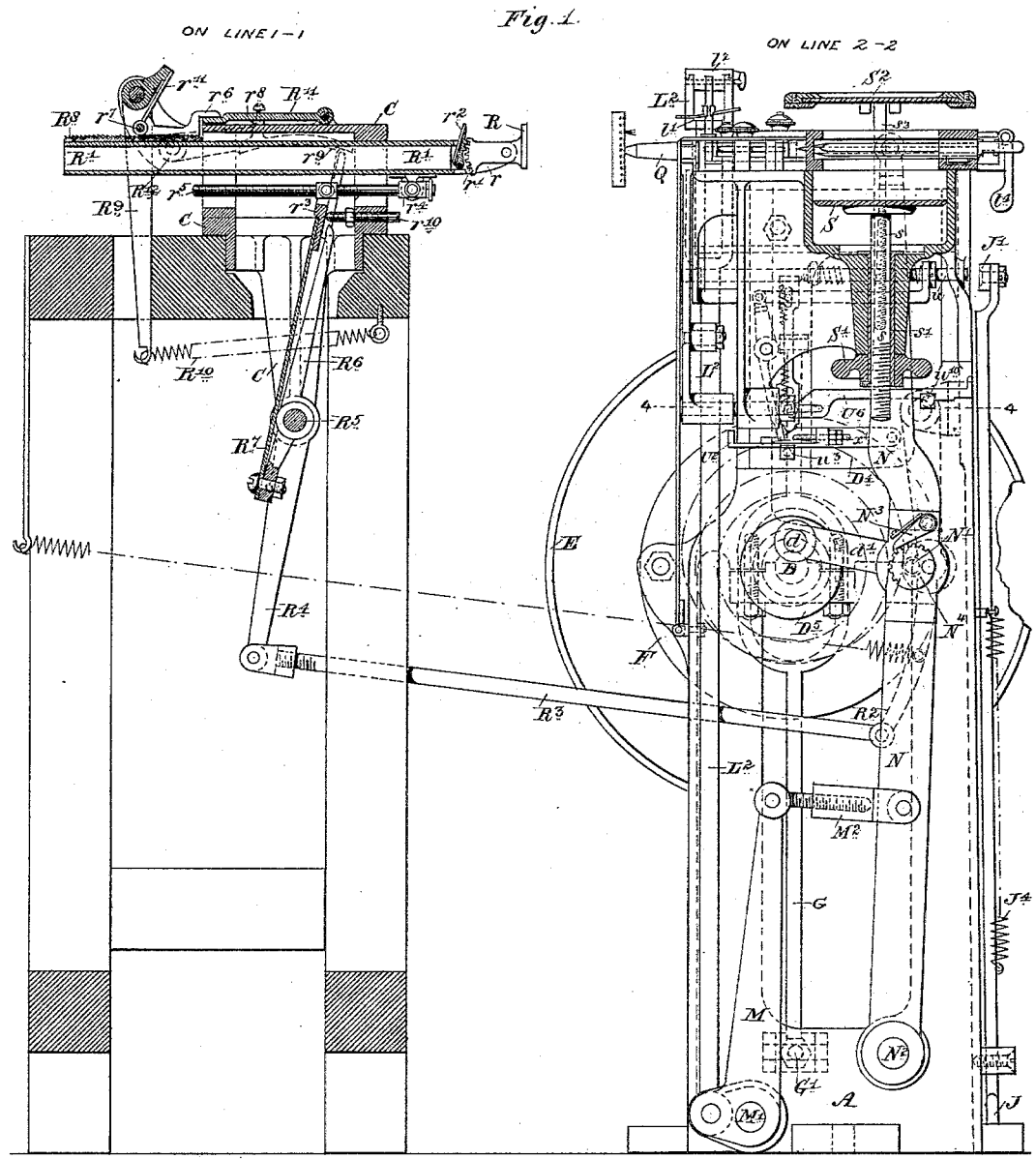

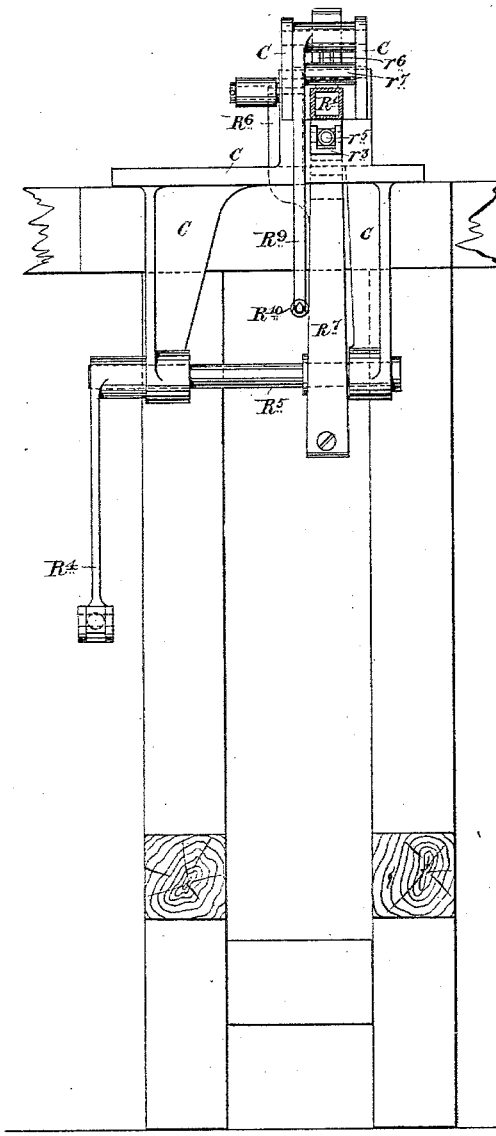

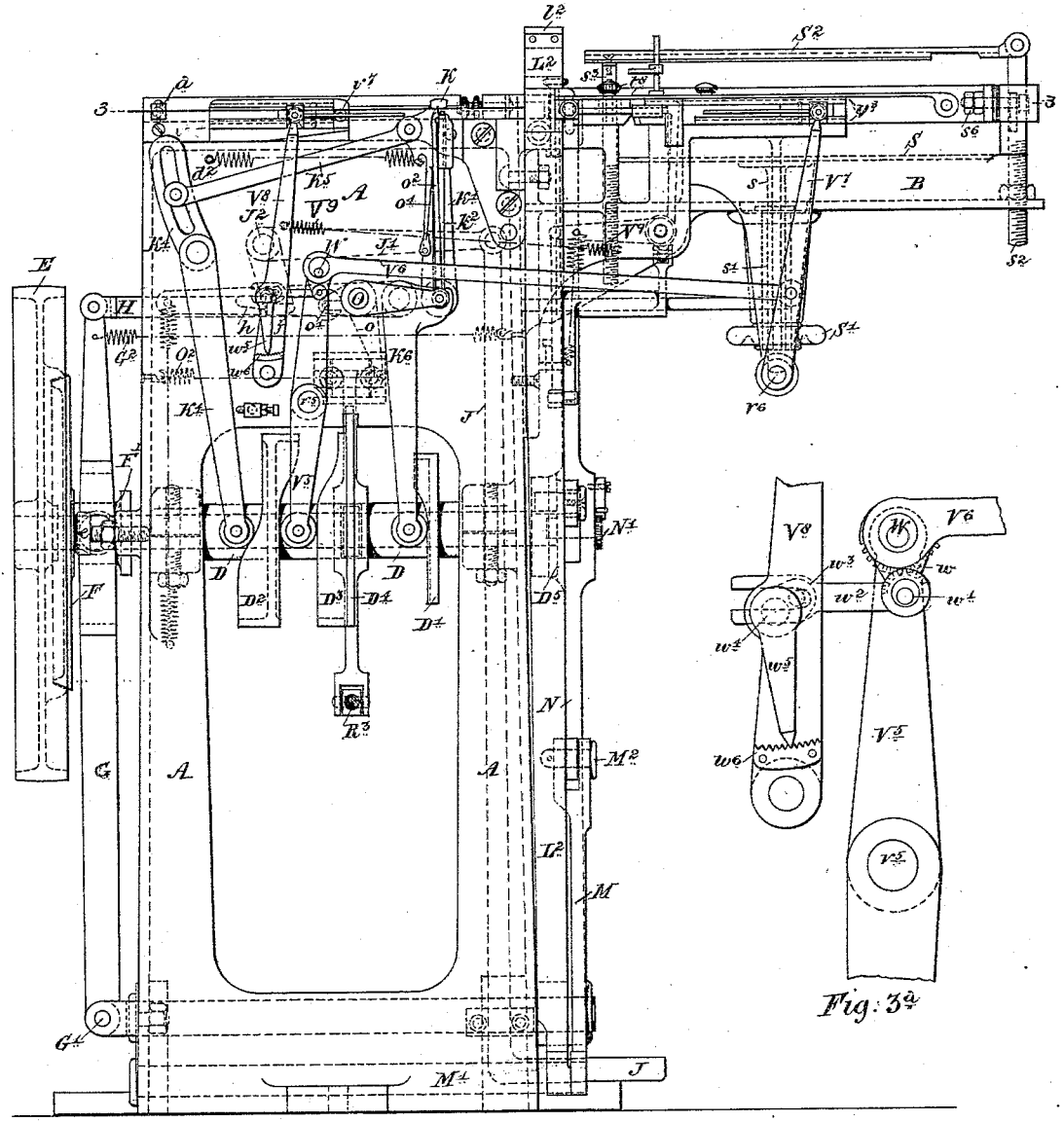

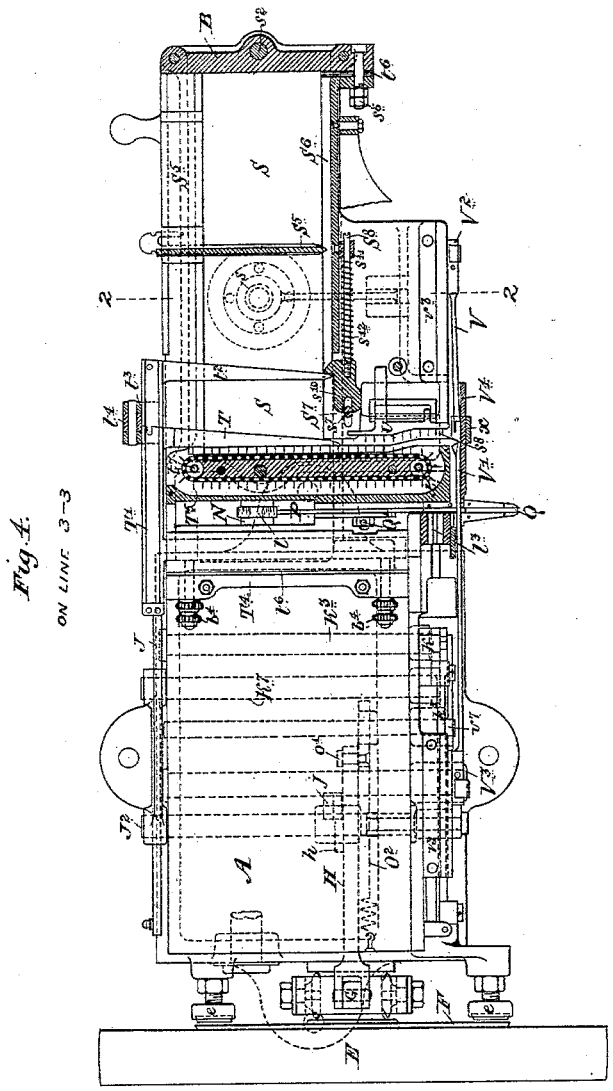

(No Model.) 9 Sheets—Sheet 6.
J. V. GANE.
APPARATUS FOR INSERTING AND FIXING THE BRISTLES OF BRUSHES, &c.
No. 378,130. Patented Feb. 21, 1888.
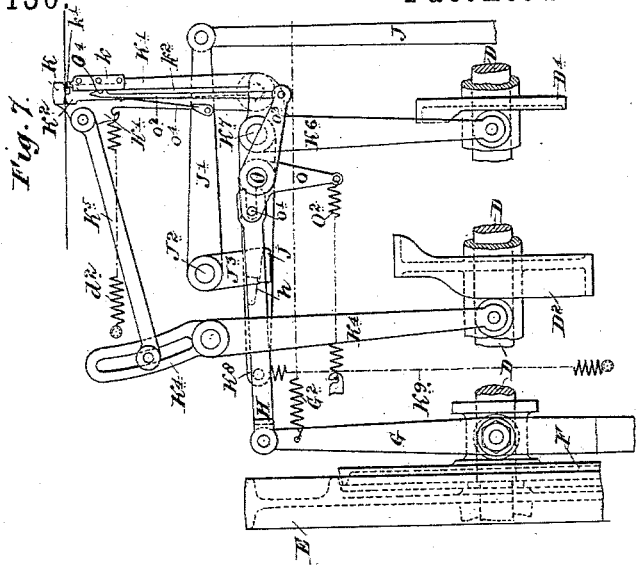
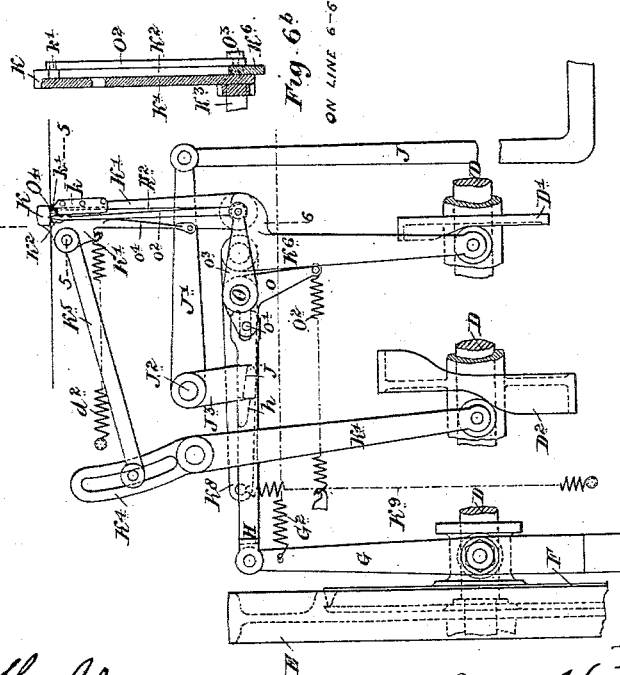
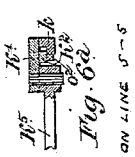
Attest
William H. Shipley,
W. R. Kennedy.
Inventor
Jean Victor Gane
by Phil. T. Dodge
atty.

(No Model.) 9 Sheets—Sheet 7.
J. V. GANE.
APPARATUS FOR INSERTING AND FIXING THE BRISTLES OF BRUSHES, &c.
No. 378,130. Patented Feb. 21, 1888.
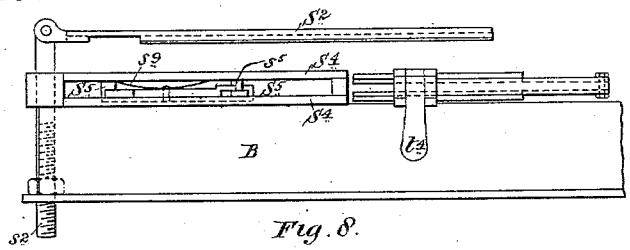
Fig. 8.
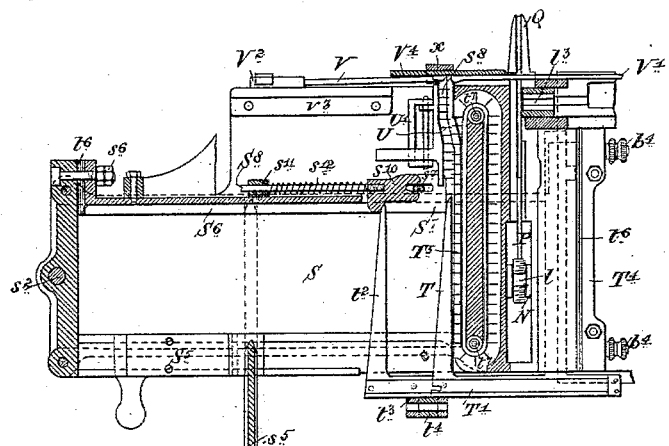
Fig. 9.
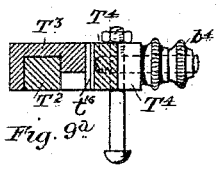
Fig. 9ª.
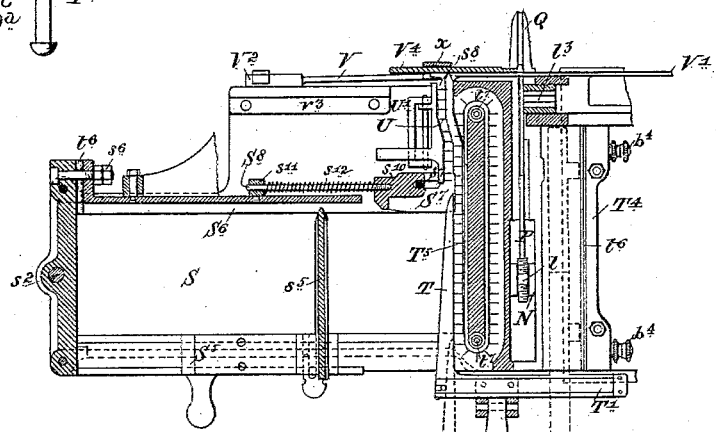
Fig. 10.
Attest:
W. H. Shipley.
W. A. Kennedy.
Inventor
Jean Victor Gane
by Phil. T. Dodge
atty.

(No Model.) 9 Sheets—Sheet 8.
J. V. GANE.
APPARATUS FOR INSERTING AND FIXING THE BRISTLES OF BRUSHES, &c.
No. 378,130. Patented Feb. 21, 1888.
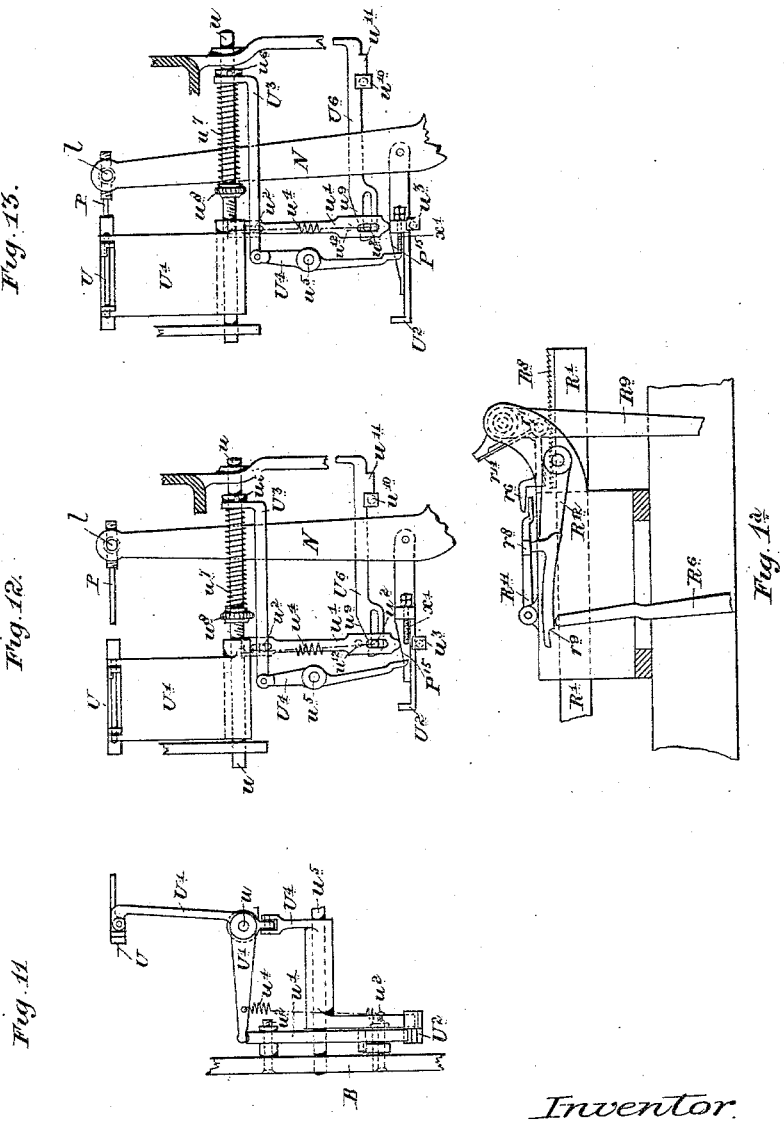

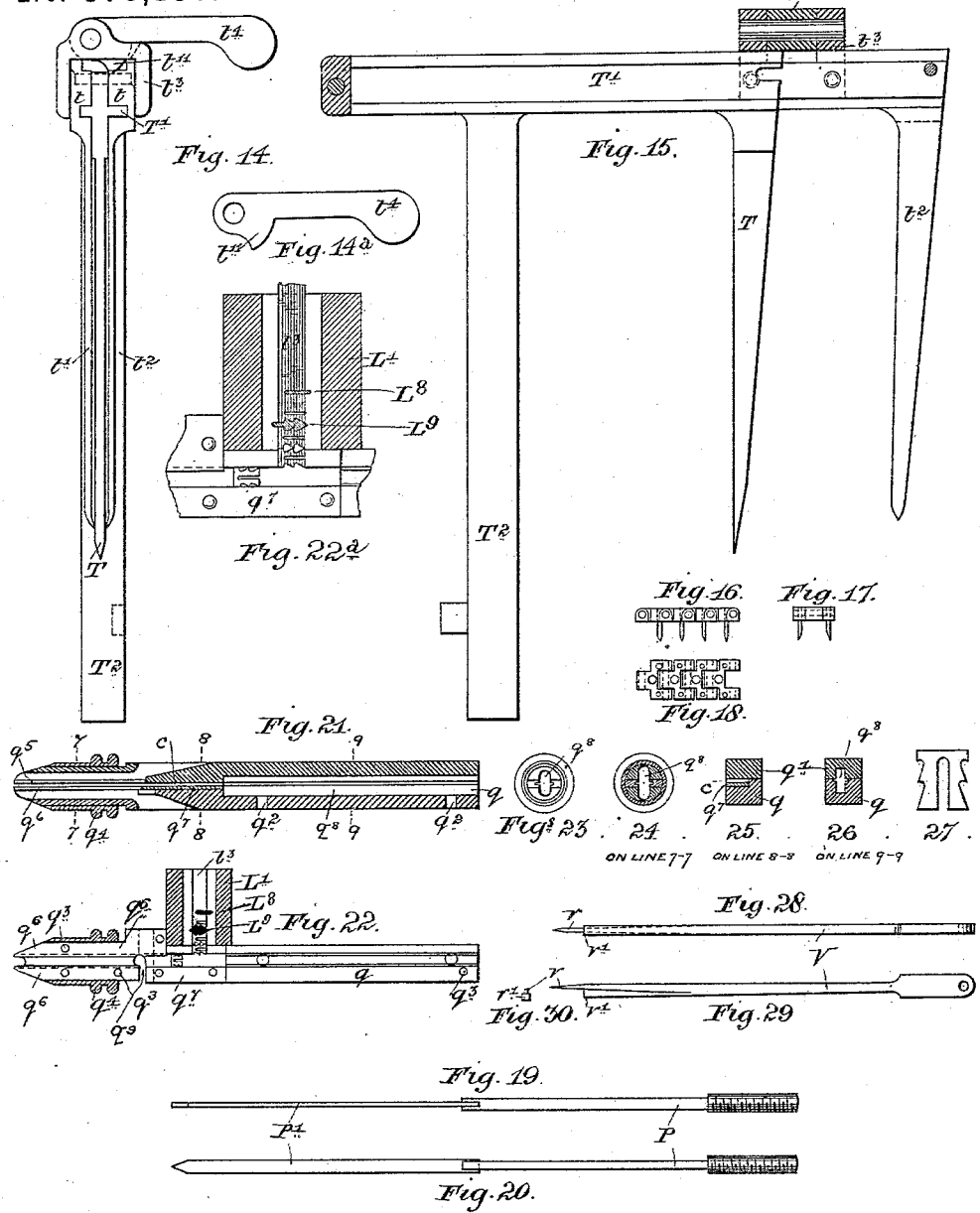

UNITED STATES PATENT OFFICE.

JEAN V. GANE, OF PARIS, FRANCE, ASSIGNOR TO FREDERICK JOHN PAGE AND CHARLES FOUNTAIN PAGE, OF NORWICH, ENGLAND.

APPARATUS FOR INSERTING AND FIXING THE BRISTLES OF BRUSHES, &c.

SPECIFICATION forming part of Letters Patent No. 378,130, dated February 21, 1888.

Application filed November 18, 1886. Serial No. 219,299. (No model.) Patented in England June 4, 1886, No. 7,498.

*To all whom it may concern:*

Be it known that I, JEAN VICTOR GANE, a citizen of the Republic of France, residing at Paris, in France, have invented new and useful Improvements in Apparatus for Inserting and Fixing the Bristles of Brushes and the Like, (patented in Great Britain June 4, 1886, No. 7,498,) of which the following is a specification.

This invention relates to machinery for inserting the bristles into the stocks of brushes and fixing the same by means of metal "anchors."

The improvements have reference to the general construction of the machine, to the engagement and disengagement of the driving and working parts, to the method of adjusting and operating the inserter-blade, the construction and method of operating the anchor-punches, to the manner in which the abutment-plate is adjusted and operated, to the separation of the fibers into layers, drawing the layers forward, dividing the same into tufts, and depositing the tufts in the axis of the inserter-tube, and to the mechanism for feeding the metal strip from which the anchors are formed and for stopping the machine when the progress of the strip is obstructed.

In the accompanying drawings, Figure 1 is a vertical section of the complete machine, the section of the abutment mechanism being taken through the line 1 1 on Fig. 5, that of the principal machine being taken through the line 2 2 on Fig. 4. Fig. 1ª is a detail of the abutment mechanism, viewed from opposite side. Fig. 2 represents a back elevation of the abutment mechanism, partially in section. Fig. 3 is an elevation of the principal machine—namely, that which performs the operations of manufacturing the anchors, separating the tufts, and inserting them into the stocks or brush-boards. This view is not taken from the operator's side of the machine, but from the abutment side. Fig. 3ª is a detail of mechanism for adjusting the stroke of the separator and counter-separator. Fig. 4 is a sectional plan taken through the line 3 3 of Fig. 3. Fig. 5 is a partially-sectional plan of both parts of the machine. The section of the tuft-inserting part is taken through the line 4 4 on Fig. 1. The abutment part is shown in full plan. Fig. 6 represents detail, with frame-work removed, of apparatus for throwing the machine into or out of gear, also for effecting the automatic stoppage thereof when the feed of the anchor metal is obstructed. As shown in this figure the machine is in gear. Fig. 6ª is a section of anchor feeding mechanism, taken through line 5 5 of Fig. 6; and Fig. 6ᵇ is a section of same, taken through the line 6 6 of Fig. 6; Fig. 7, a detail similar to Fig. 6, showing the relative position of the parts when the machine has been thrown out of gear owing to the anchor-wire being obstructed. Fig. 7ª is a side elevation of a portion of the punching mechanism. Figs. 8, 9, 9ª, and 10 are details illustrative of the manner in which the fiber-packets are placed in the machine and divided into layers. Figs. 11, 12, and 13 are details of the apparatus for effecting the movement of the layers toward the separating mechanism. Figs. 14 and 15 are respectively elevation and plan of the "trident." Fig. 14ª is a horizontal section through a portion of the inserter tube and the mechanism for punching and guiding the anvils. Figs. 16, 17, and 18 are details of the comb-chain. Figs. 19 and 20 are elevation and plan of the inserter. Figs. 21 and 22 are sectional elevation and sectional plan of the inserter-tube, the latter including a section of the fixed mold or matrix on which the anchors are stamped or cut out. Fig. 22ª is a detail, full size. Fig. 23 is a front view of the inserter-tube; Fig. 24, a cross-section through the line 7 7 on Fig. 21; Fig. 25, a cross-section through 8 8, and Fig. 26 a cross-section through 9 9. Fig. 27 shows shape of anchor. Figs. 28, 29, and 30 are respectively elevation, plan, and end view of the separator. Figs. 31, 32, and 33 are similar views of the counter-separator.

In describing the machine it will be convenient to divide the various parts constituting the same into six groups: first, the principal driving and engaging parts; second, the inserter and the parts relating thereto; third, the abutment for the back or "stock" of the brush and parts acting in conjunction therewith; fourth, the parts relating to the manufacture of the anchor; fifth, the mechanism for automatically stopping the machine when the feed of the anchor metal is obstructed; sixth, the fiber-feeding mechanism.

*Description of the first group, comprising the principal driving and engaging parts.*—A is the principal frame of the machine, which is fixed to the ground. B is the frame for the carriage of the fibers and the apparatus for feeding the same. The two parts of the frame are bolted and screwed together. C, Figs. 1 and 2, is the frame-work carrying the abutment mechanism. This is for convenience constructed and mounted on wood-work separately from the principal frame. D is the main driving-shaft, on which are fixed the face-cams D' D² D³ and the eccentric cam D⁴, the latter being formed on the periphery of the cam D³. The cam D' serves to separate the lower nipping-jaw from the upper one after each forward movement of the strip of anchor metal. The cam D² gives the nipping-jaws their forward motion, and also, in conjunction with cam D³, operates the separator and counter-separator, and cam D⁴ controls the movements of the abutment mechanism. On one end of the shaft D is a loose pulley, E, in which is formed a female cone, and sliding on a feather on the said shaft is the male cone F, formed with a flanged collar, F'. At G' is hinged a yoke-lever, G, carrying anti-friction pulleys, which engage between the flanges of the cone F, and to the upper end of the lever G is jointed an arm, H, the forked end of which receives a pin or stud, o', Figs. 6 and 7, on the bell-crank lever o, which forms part of the automatic disengaging mechanism, hereinafter described. On the rod H is a stop or projection, h. (See Figs. 3, 6, and 7.) To put the machine into operation, the attendant places his foot on the treadle J, which is connected with the lever J' on the end of the shaft J². On the shaft J² is also fixed a short arm, J³, carrying a stop or projection, j, this stop and the stop h on the rod H being in the same horizontal plane. When the treadle J is depressed, the lever J' is pulled down, rotating shaft J², which also moves arm J³, and the stop j, coming in contact with the stop h, forces the arm H and lever G toward the loose driving-pulley E and puts the friction-cone F into gear therewith. When it is desired to stop the machine, the attendant removes his foot from the treadle J, and the spring J⁴ (see Fig. 1) raises the same, and, the pressure being taken off the stop h, the spring G², Figs. 3, 4, 6, and 7, draws the friction-cone out of gear with the pulley E, the extent to which the cone is withdrawn being limited by the adjustable buffers e e.

On the inner end of the shaft D is mounted a face plate or disk, D⁵, carrying a crank-pin, d, the latter being connected by a link, d', to the lever N, fulcrumed at N², which imparts motion to the blade of the inserter, and also to the dies or punches which cut out the anchor and to the comb which feeds the tufts.

*Second group, comprising the inserter and parts relating thereto.*—The inserter, which is fixed in the upper end of the lever N, consists of two parts, the body P and the blade P', which are brazed or otherwise fixed together. (See Figs. 19 and 20.) The end of the body is threaded and is screwed, as shown in Figs. 4, 8, and 10, into a swivel-stud, l, in the upper and forked end of the lever N. The blade of the inserter is formed of tempered steel and may be either flat, as shown in drawings, diamond shaped, or oval in section, according to the size of the anchor or the power required to effect the insertion thereof. It works in grooves formed in the center of the inserter-tube Q.

The inserter-tube consists, essentially, of a piece of steel rectangular for about two thirds of its length, the remaining third being round and terminating in a conical nozzle. It is constructed with an axial opening for the passage of the inserter and lateral openings for the admission of the tufts of bristles, the anchors, and the separators. As the construction of the inserter-tube forms one of the features of this invention, it is shown in detail in Figs. 21 to 26 of the accompanying drawings. It is formed in two parts, q q', the lower part, q, being connected to the frame-work by means of pins entering holes q². The two halves are fitted accurately together by means of pins q³, and secured by a ring or sleeve, q⁴, and set-nut Q'. The opening or passage q⁸ for the inserter is irregular. For the greater part of its length it is of such section as to admit the body of the inserter, which should slide freely therein. (See Fig. 26.) It is then reduced in the portion c d, so as to admit only the blade of the inserter, and terminates in an oval channel for the passage of the folded tuft, as shown in Figs. 23 and 24. Each side of the channel is grooved throughout, in order to keep the inserter-blade and the anchor in the center. In the rectangular portion of the channel which admits the body of the inserter the grooves, as also the principal channel, are formed by cutting away the metal of the parts q and q'. The constant friction of the inserter-blade has, however, a tendency to enlarge the grooves, and therefore in the front portion of the tube, where the greatest accuracy is required, the grooves are formed in separate thin plates of tempered steel, q⁵ q⁶, let into the lower half of the tube and held in position by the pins q³, a similar piece of steel, q⁷, being inserted for the purpose of preserving the dimensions of the flat portion of the channel shown in Fig. 25. As the pieces q⁵, q⁶, and q⁷ wear away, they can be renewed at a comparatively little expense, whereas if the inserter-tube were formed in one piece the whole would be rendered useless. The link d', connecting the face-plate D⁵ and lever N, imparts to the latter a backward-and-forward motion, which is transmitted to the inserter P. In the backward motion the blade is withdrawn sufficiently to allow one of the stamped anchors to be pushed into the axis of the inserter-tube.

As soon as the anchor is in position, the inserter commences its forward motion, encounters the anchor, and forces it and the tuft of bristles which has meanwhile been deposited in the axis of the inserter through the lateral opening $q^9$ into the previously-drilled hole of the brush board or stock which the attendant holds against the conical end of the inserter-tube, as shown in Fig. 1. The travel of the inserter can be regulated either by means of the screwed end passing through the stud $l$ or by the segment-wheel $N^4$, governing the eccentric stud $N'$, whose position may be determined by the pawl $N^3$ engaging with teeth upon $N^4$, as shown in Fig. 1.

*Third group, comprising the abutment for the back of the brush and the mechanism for operating the same,* (Figs. 1, 2, and 5.)—The abutment consists of a small metal plate, R, hinged between lugs or wings $r$, formed by prolonging the sides of a rectangular tube, $R'$. On the tail-piece of the plate R is formed a toothed segment, $r'$, gearing with a toothed pawl, $r^2$, the two being kept in contact by a spring. The rectangular tube is carried by the frame-work C, being capable of sliding backward and forward therein, such motion being communicated to it by means of the cam $D^4$, lever $R^2$, connecting-rod $R^3$, attached to lever $R^4$, rock-shaft $R^5$, and flexible lever $R^6$. The flexible lever $R^6$ is composed of the rigid part $R^6$, to the bottom of which is attached a flat spring, $R^7$, the upper end of which terminates in a metal fork, $r^3$, carrying a swivel-nut. To the under side of the tube $R'$ is fixed a swivel-collar, $r^4$. A screwed rod, $r^5$, having a milled head, passes through this collar and through the nut in the forked end of the spring $R^7$, thereby connecting the tube $R'$ with the lever $R^6$, and also regulating the distance between the plate R and the inserter-tube Q, according to the thickness of the brush board or stock.

As shown in the drawings, the abutment-piece R is set to its backward limit—that is, at its extreme distance from the inserter. If when the machine is in the position shown a brush-board be placed close to the inserter Q and the screw $r^5$ turned until the abutment-plate presses against the back of the said "board," the requisite adjustment will be at once obtained. In order to render the abutment-piece more rigid during the insertion of the tuft, a ratchet-plate, $R^8$, is fixed to the top of the tube $R'$, with the teeth of which engage the teeth of the three pawls $r^6$, which are mounted on a stud, $r^7$, carried by the lever $R^9$. The pawls engage with the ratchet-teeth only during the insertion of the bristles, and the necessary amount of resistance is afforded by means of a spiral spring, $R^{10}$, attached to the bottom of the lever $R^9$, the strength of the spring being proportioned to the size of the hole to be filled.

The engagement and disengagement of the pawls at the right moment are effected as follows: The ends of the pawls rest on a lever, $R^{11}$, on which is formed a lateral projection, $r^8$, which rests on a rib formed on a lever, $R^{12}$, fulcrumed on the outside of the frame. The lever $R^{12}$ rests on the end of the rigid part of the lever $R^6$, the upper part of which is bent outward. (See Fig. 2.) When the extreme end of the lever $R^{12}$ rests on that of the lever $R^6$, which occurs when the abutment-piece has reached the extent of its forward motion, the pawls $r^6$ engage with the ratchet-teeth; but as soon as the return motion commences the end of the lever $R^6$ comes in contact with a cam or incline, $r^9$, on the under side of the lever $R^{12}$, thereby raising this lever, and at the same time the lever $R^{11}$ and the pawls $r^6$, thus releasing the abutment. The pawls $r^6$ are kept out of gear during the whole of the backward-and-forward motion of the abutment-piece. It must be observed that the forward motion of the abutment-piece ceases as soon as the fork $r^3$ on the end of the spring $R^7$ comes into contact with the adjustable screw $r^{10}$, and before the end of the lever $R^6$ is clear of the cam or incline $r^9$. The lever $R^6$, however, continues to move after the spring has been arrested until it has passed the end of the cam or incline $r^9$ and allowed the pawls to descend on the ratchet-teeth while the latter were perfectly stationary. In like manner, on the return movement the lever $R^6$ will reach the cam or incline $r^9$ and raise the pawls $r^6$ before coming into contact with the spring $R^7$, and therefore before the abutment-piece is set in motion. To secure greater delicacy of adjustment without impairing the strength of the parts, the teeth of the pawls $r^6$ are arranged so as to break joint—that is to say, the teeth of the second are set back a distance equal to a third of the pitch from the first, and those of the third are equally behind those of the second. As one pawl is sufficient to resist the thrust of the inserter-blade, I obtain by this arrangement the strength of a coarse rack with the accurate adjustment of a fine one. To prevent the pawls from slipping or sticking, springs $r^{11}$ are attached to the boss of the lever $R^9$, the loose ends of which bear against heels or projections formed on the pawls.

*Fourth group, the parts relating to the manufacture of the anchors,* (see Figs. 6 and 7.)—The anchors for fixing the tufts in the brush-stocks are stamped from metal strips, the width of which is equal to the length of the anchors and the thickness in proportion to the strength required. The metal employed for this purpose may be either soft iron, tinned iron, or brass. The strip is wound on a drum or reel and sufficient is fed to the stamping mechanism at each operation to form the anchor and allow for the waste produced in cutting it off. It is essential that the anchor should be the same width as the grooved channel of the inserter-tube; otherwise it might escape the inserter before penetrating the wood. On leaving the reel the metal strip passes through a tension-block, $a$, Fig. 3, and thence between the nipping-jaws K and $K^2$, which feed it to the stamping mechanism. The upper jaw, K, consists of a projection formed on the end of the lever $K'$, the latter being mounted on the end of a shaft, K³. (See Fig. 4.) Oscillatory motion is imparted to the lever K' by means of the cam D² in the forward movement and spring d² on the return, the motion being communicated from the cam by means of the lever K⁴ and connecting-rod K⁵. The slot in the upper end of the lever K⁴ allows for variation in the extent of motion imparted to the lever K', depending on the size of the anchor. The lower nipping-jaw, K², consists of a vertical rod rounded at its lower end and resting in a socket formed in the short arm of the bell-crank lever K⁶, and guided at its upper end by the piece k, which is riveted or otherwise attached to the lever K'. (See detail, Fig. 6ª.)

The bell-crank lever K⁶ is mounted on one end of a shaft, K⁷, Figs. 4 and 7, on the other end of which is mounted a lever, K⁸. A tension-spring, K⁹, causes the lever K⁶ to follow the face of the cam D'. The latter is timed to act on the lever K⁶ and separate the lower jaw from the upper one directly after the termination of the forward stroke, the jaws remaining open during the return stroke, when they are again closed by means of the spiral spring K⁹.

The anchors are stamped by two punches, L⁸ and L⁹, fixed to a block, L, (see Figs. 7ª, 22, and 22ª,) and entering dies or matrices formed in a block, L', which is fixed to the frame-work of the machine. The punch L⁸ first acts on the metal strip or blank, forming an incision in one edge, after which the punch L⁹ acts, severing one anchor from the end of the strip and giving it form on one edge, while at the same time it gives form to the forward edge of the metal which is cut off by the next operation to form a second anchor. The block L is carried by the rod L², (see Figs. 1, 3, and 7ª,) which is forked at its upper end, the block resting on shoulders l', formed on the branches of the fork and being secured by means of the cross-piece or cap l², which closes the top of the fork. The rod L² is attached at its lower end to the short arm of the bell-crank lever M, Figs. 1 and 3, which is fulcrumed on the end of the shaft M', the longer arm being connected by the adjustable link M² with the lever N. The oscillatory motion of the lever N is thus imparted to the lever M, which transmits it in the converted form of a rising-and-falling motion to the rod L². In the die-block L' is formed a groove or channel, l³, (see Figs. 22 and 22ª,) the exact width of the anchor metal and leading directly to an opening of the same size formed in the lower portion, q, of the inserter-tube. The actual stamping of the anchor takes place in the short interval which elapses between the termination of the feed and the release of the metal strip by the jaw K².

*Fifth group.*—It may happen from various causes—such as the wear or rupture of a punch or matrix—that the anchor may be imperfectly stamped, or it may not be stamped at all, or it may be obstructed on its way to the inserter-tube, and so interfere with the feed of the anchor metal without being noticed by the attendant, and thereby incur loss of time and material. This inconvenience is obviated by the use of automatic disengaging mechanism, the operation of which is illustrated in Figs. 6, 6ª, 6ᵇ, and 7. On the shaft O is mounted a bell-crank lever, o, one arm of which carries a pin or stud, o', which plays within the forked end of the rod H. A spiral spring, O², is attached to the other arm of the lever and to the frame-work. The tendency of this spring acting on the lever o is to raise the forked end of the arm H and disengage the stops h and j, as shown in Fig. 7. This tendency is counteracted by means of the trigger o², consisting of a rod with a hook or catch, O⁴, at its upper end, the lower end being connected to the lever o³ on the end of the shaft O. The upper end of the trigger-rod catches very slightly onto the edge of the guide-piece k, which is fixed to the lever K', and is kept in position by a flat spring, o⁴, mounted on the said lever. On the upper end of the jaw K² is a small projecting piece, k'.

It must be observed that only the upper jaw, K, has a positive motion imparted to it, the lower jaw partaking of the forward motion on account of the frictional adhesion resulting from the pressure exerted upon the anchor metal, its return motion being due to the guide k. If, therefore, the anchor metal is obstructed and ceases to move, the jaw K² must do likewise; but the upper jaw, K, being positively driven, cannot stop. It therefore has to slide over the metal strip; but before it can advance a perceptible distance the projection k' on the jaw K², which is stationary, dislodges the trigger or catch-rod o², which is moving with the jaw K, from the edge of the guide-piece, and so allows the spring O², through the medium of the bell-crank lever o, to raise the arm H and disengage the stops h and j, whereupon the spring G² draws the friction-cone F out of gear with the pulley E, and so stops the machine, the position of the parts at this moment being as shown in Fig. 7.

*Sixth group, the movement of the fibers.*— This group may be subdivided into four parts: first, the placing in position of the packets of fibers; second, the separation of the same into layers; third, the progressive or forward movement of the layers; fourth, the separation and conveyance of the tuft into the axis of the inserter-tube.

First part: the placing of the packets of fibers in the receptacle provided therefor: The fibers rest upon an adjustable table, S, which is surrounded on three of its sides by the part B of the frame-work. (See Fig. 3.) This table is carried by a rod, s, having an external thread and passing through a sleeve, s', having an internal thread. A hand-wheel, S', is fixed on the lower end of the sleeve, and the latter is carried by a boss in the frame B. (See section, Fig. 1.) When placed in position on end, the fibers are covered by a glazed frame, S², which is hinged to a threaded rod, $s^2$, and supported at its other end by a rod, $s^3$, which is screwed through the frame-work. The manner in which the table S and the cover $S^2$ are supported admits of their being raised or lowered at pleasure, according to the length of the bristles. If the bristles are to be folded in the middle, the table and cover will be adjusted equidistantly below and above the axis of the inserter; but their relative position will always depend on the length of bristle and the point at which they have to be doubled. On the attendant's side of the frame B is a fixed guide for the fibers, consisting of two cheeks, $S^4$, fixed at a slight distance apart, so as to afford space for the slide $S^5$, which carries the compressor $s^5$. The compressor is moved laterally by means of the slide and transversely within a groove formed in the slide. The upper portion, $S^6$ of the side of the fiber-receptacle farthest from the operator is movable and adjustable by means of the nuts and bolt $s^6$ and set-screws $s^7$, whereby the width of the channel $s^8$, along which the fibers travel, may be changed at pleasure. This adjustment of the width of the channel is effected by means of metal strips $t^5$, inserted between the end of the guide $S^6$ and the frame B. On commencing to work the machine the operator adjusts the glazed cover $S^2$ according to the distance which the bristles ought to project from the body of the brush. He then adjusts the table S, leaving sufficient space between it and the cover $S^2$ to allow the bristles to stand upright. The cover $S^2$ is then thrown back and the slide $S^5$ pushed to the left and the compressor $s^5$ withdrawn, as shown in Fig. 9. A packet of fibers is then placed on the table S, the compressor $s^5$ reinserted, the string binding the packet together is then removed, the cover $S^2$ replaced, and the fibers are ready to be divided into layers. The fibers occupy the space between the compressor $s^5$ and the trident, about to be described.

Second part, division of the fibers into layers: The fibers are divided into layers by means of a trident consisting of a central prong, T, fixed to a cross-piece, T'. The cross-piece T' forms a bed or guide for two slide-plates, $t$ $t$, each of which carries a prong, $t' t^2$, the slides being connected by a bent plate or jaw, $t^3$, to which is hinged a handle, $t^4$. Parallel to the prong T and fixed to the cross piece T' is a rectangular arm, $T^2$, which works in an adjustable guide, $T^3$. This guide is shown in section in Fig. 9$^a$. It is held in position on the top of the frame A by means of bolts and nuts $b^4$, which bind it to a bar, $T^4$, the latter being bolted to the frame. Packing-strips $t^6$ are placed between the guide $T^3$ and the bar $T^4$, the use of which is hereinafter described. $T^5$ is an endless chain comb, the construction of which is shown in Figs. 16, 17, and 18. This comb passes round guide pulleys or rollers $t^7$, which are adjustable and can be turned by hand in either direction, being provided with milled nuts $t^8$ (see Fig. 3) for the purpose. The central prong, T, of the trident is capable of a reciprocatory movement across the fiber-receptacle and parallel to the endless comb. The outer prongs, $t' t^2$, are capable, in addition to this reciprocatory movement, of a similar movement at right angles thereto. When a packet of fibers or bristles is placed in position on the table S, the operator takes hold of the handle of the compressor $s^5$ in his left hand and the handle $t^4$ of the trident in his right, compressing the bundle of bristles and moving the whole simultaneously toward the endless comb until the three arms T, $t'$, and $t^2$ coincide, as shown in Fig. 10. He then draws the trident outward, as shown by dotted lines in Fig. 10, continuing to press the fibers forward with the compressor $s^5$ against the endless comb. The trident is then pushed inward, whereby a layer of fibers is cut off equal in thickness to the space between the prong T and the body of the comb $T^5$, and the prongs $t' t^2$ of the trident, with the compressor $s^5$ and the remaining fibers are moved back to their original position. The elasticity of the mass of fibres is counteracted by means of a spring, $S^9$, screwed to the slide $S^5$ and pressing against the upper guide cheek $S^4$, and also by a stop, $t^{q}$, Fig. 14$^a$, formed on the handle $t^4$. When the prongs $t' t^2$ of the trident have been moved away from the comb, the handle $t^4$ is pressed downward and the stop $t^{11}$ comes in contact with the end of the slide or cross-piece T', which carries the central prong, T. It will be noticed that when the trident is withdrawn, as shown in dotted lines, Fig. 10, the entrance from the fiber-receptacle S to the channel $s^8$ will be left open. To obviate this, which is apt to cause derangement of the fibers, a stop-piece, $S^7$, (see Figs. 4, 9, and 10,) is employed. This stop-piece consists of two plates held apart by a block, $s^{10}$, into which is screwed one end of a rod, $S^8$, the other end sliding on a stud, $s^{11}$. The rod $S^8$ and stud $s^{11}$ and one of the previously-mentioned studs, $s^7$, which passes through a slot in the stop, act as guides therefor, and a spring, $s^{12}$, on the rod $S^8$, tends to press the stop forward and close the entrance to the channel $s^3$. When the trident is withdrawn, the stop-piece is pressed forward by the spring $s^{12}$ and the passage is closed until a layer of fibers has been cut off. When, however, the two outer prongs, $t' t^2$, of the trident are pushed back to the position shown in Fig. 9, they encounter the central block, $s^{10}$, of the stop-piece and reopen the channel $s^8$.

Third part, forward movement of the layers toward the inserter Q, Figs. 1, 4, 9, 10, 11, 12, and 13: The forward movement of the layers is effected by means of a comb, U, hinged to the upper end of a bell-crank lever, U', the latter being fulcrumed on a shaft, $u$, which is capable of oscillating and moving endwise in its bearings. The horizontal arm of the lever U' rests on the end of the vertical rod $u'$, which is channeled to receive it. The rod $u'$ is slotted at each end, and through these slots pass the guide-pins $u^2$. The lower end of the rod $u'$ rests on a horizontal bar, $U^2$, which is jointed to the lever N and supported midway by a guide-block, $u^3$, fixed to the frame-work. (See Figs. 12 and 13.) On one-half in width of the bar $U^2$ is formed a cam or incline, $P^{15}$, on which rests the rod $u'$. Contact is preserved between the horizontal arm of the lever $U'$, the vertical rod $u'$, and the bar $U^2$ by means of a spring, $u^4$. The parts just described effect the oscillatory motion of the comb U. The endwise motion is effected by means of an arm, $U^3$, spread out and bent upward at one end and jointed at the other to a lever, $U^4$, mounted on the shaft $u^5$. Through the turned-up end of the arm $U^3$ passes the shaft $u$, on which are a fast collar, $u^6$, a spring, $u^7$, and an adjustable nut, $u^8$. In considering this part of the invention it must be remembered that the endless comb $T^5$ has no direct automatic motion imparted to it, provision being made, however, to enable the attendant to turn it by hand. The one row of teeth of the comb U intercalate with the double row of the endless comb $T^5$, being arranged to enter midway between the two rows, so that the teeth never come into contact if either comb move independently of the other. Such independent motion can only occur, however, when there are no bristles interposed between the two combs. Otherwise a layer of bristles, when set in motion by one comb, would impart motion to the other one if the teeth were intercalating. On commencing to work the machine the first layer of bristles cut off will be equal in length to the width of the table S, and will not reach the comb U. The operator therefore places the comb U so that the teeth thereof do not intercalate with those of the endless comb, and then turns the latter round by hand until the bristles enter the bend of the channel $s^8$, and the machine is ready to commence operating. The horizontal bar $U^2$, being jointed to the lever N, receives a reciprocatory motion therefrom and imparts through the rod $u'$ an oscillatory motion to the comb U, as before stated, the forward movement of the lever N causing the teeth of the comb to be withdrawn from the fibers and the backward movement allowing them to penetrate the said fibers. When the teeth of the comb U are clear of the fibers, an adjustable screw-stop on the bar $U^2$ comes into contact with the lever $U^4$ and causes it, through the medium of the arm $U^3$, to move the shaft and lever $U'$ and comb U endwise toward the fiber-receptacle S. The return movement of the lever N permits the comb U to penetrate the fibers, and when this has taken place the turned-up end of the bar $U^2$ comes into contact with the lever $U^4$ and moves the comb back to its original position, carrying the layer of fibers and endless chain comb $T^5$ along with it, the extent of motion being sufficient to provide bristles for one tuft. It is necessary at times to place the comb U out of operation, in order that some other portion of the machine, and especially the endless comb $T^5$, may be worked independently thereof. For this purpose the bar $U^6$ is employed, this bar having a cam or incline, $u^9$, at one end, and being supported by a guide-block, $u^{10}$, and the pin $u^2$, which passes through a slot in the other end thereof, this pin also guiding the rod $u'$. To place the comb out of operation, the bar $U^6$ is raised until the stop piece or projection $u^{11}$ is clear of the guide-block $u^{10}$. It is then pushed forward, and the inclined end, passing underneath a pin, $u^{12}$, on the back of the rod $u'$, will raise the same in the same manner and with the same result as the incline $P^{15}$ on the bar $u^2$, and the comb U will be kept clear of the fibers until the bar $U^6$ is returned to its normal position, in which it is shown in Figs. 12 and 13.

Fourth part, relating to the formation and transport of the tuft and the various devices for regulating the thickness thereof: The tuft is formed or detached from the layer of fibers compressed in the channel $s^8$ by means of two blades, called, respectively, the "separator" and "counter-separator." The former is shown in detail in Figs. 28, 29, and 30, and the latter in Figs. 31, 32, and 33. The relative positions which they occupy in the machine are shown in Figs. 3, 4, 9, and 10, in which V indicates the separator, and V' the counter separator. The function of the separator is to detach or separate the tuft from the layer, which it does by means of its pointed end $v$, the tuft thus separated being then carried into the axis of the inserter Q, being held between the shoulder $v'$ of the separator and the end of the counter-separator. To effect this transfer of the fibers, it is necessary that the parts V and V' should have a reciprocatory movement imparted to them simultaneously in the same direction. This movement is obtained from the cams $D^2$ and $D^3$ as follows: The separator V is attached to a sliding block, $V^2$, (see Figs. 3 and 4,) which is mounted in guides $v^3$, fixed to the frame-work B, and the counter-separator is similarly attached to a slide-block, $V^3$, mounted in guides $v^4$, fixed to the frame-work. The juxtaposed ends of V and V' are guided by a plate, $V^4$, fixed to the frame B and carried as far as the channel of the inserter Q. The parts V and V' are "set" in their blocks $V^2$ and $V^3$ so as to spring or bear against the plate $V^4$. The cams $D^2$ and $D^3$ impart oscillatory motion to a lever, $V^5$, fulcrumed at $v^5$, (see Fig. 3,) to the top of which is jointed by means of an eccentric stud, W, a rod, $V^6$, connecting the lever $V^5$ with a lever, $V^7$, fulcrumed at $v^6$ to a branch of the frame-work B. The upper end of the lever $V^7$ enters the block $V^2$, forming a socket or toggle joint. On the end of the connecting-rod $V^6$ which is jointed to the lever $V^5$ is a short arm, $w$, (see Fig. 3ᵃ,) to which is jointed by means of an eccentric stud, $w'$, a clutch-fork, $w^2$, which clutches a pin or stud on a crank-arm, $w^3$, mounted on one end of the stud $w^4$, which passes through a lever, $V^8$, Figs. 3 and 3ᵃ, and carries a spring-pawl, $w^5$, gearing with a rack, $w^6$, fixed to the lever $V^8$. The lever $V^8$ engages with the slide-block $V^3$ of the counter-separator in the same manner as described in reference to the separator. The levers V⁷ and V⁸ may be attached to the slides by any ordinary joint which will compensate for the difference in movement due to the fact that the levers swing in the arcs of circles, while the slides reciprocate in straight lines. These connections, with which every mechanic is familiar, form no part of the invention.

On reference to Fig. 3 it will be observed that the roller of the lever V⁵ is on the summit of the cam D², and that therefore the lever V⁷ and separator V are at the commencement of the stroke, the end of the separator V being clear of the channel $s^8$. The counter-separator under the influence of the spring V⁹ has followed the separator until it has reached the mouth of the channel $s^8$, being stopped at this point by the slide-block V³ coming in contact with a stud, $v^7$. At this stage of the operation there is a slight distance between the ends of the separator and the counter-separator, which is necessary for the introduction of the tuft. To seize the tuft it is therefore necessary that the separator should commence to move slightly in advance of the counter-separator and close thereon before the fork $w^2$ commences to act on the stud $w^3$, and therefore on the lever V⁸, and this it does in consequence of the stop $v^7$ having arrested the counter-separator before the separator had completed its previous movement, thus leaving a slight space between stud $w^3$ and the terminus of the fork $w^2$. The amount of the space thus left is regulated by means of the eccentric studs W and $w'$, which gear with each other, are of different diameters, and move in opposite directions, whereby an exceedingly-fine adjustment can be obtained, while the crank-arm $w^3$, controlled by the spring-pawl $w^5$, whose position on the toothed quadrant $w^6$ can be adjusted by hand, fixes the nearest approach of the separator and counter-separator according to the size of the tuft.

The size of the tuft is dependent on the thickness of the layer and the quantity fed by the comb U. The thickness of the layer may be increased or decreased by inserting or removing packing-strips—such as $t^{16}$, Figs. 9, 9ª, and 10—between the guide T⁵ of the trident and the fixed bar T⁴. If packing is removed and the nuts $b^4$ tightened, the guide will be drawn nearer to the bar, and the central prong, T, of the trident will in consequence be drawn toward the chain comb T⁵, whereby the thickness of the layer cut off at each stroke will be reduced. Whatever alterations may be made in the thickness of the layer, the channel $s^8$ must be regulated to correspond therewith, and this is effected by introducing or removing packing, $t^5$, between the movable guide S⁶ and the end of the frame-work B.

The forward movement of the fibers is regulated by the screw on the bar U², which controls the "reach" or sidewise movement of the comb U at the commencement of the feed, and also by the spring $u^7$, which regulates the amount of pressure exerted by the comb U on the fibers as it feeds them toward the separator. As an additional safeguard against excessive feeding, the opening of the channel $s^8$ may be contracted by means of a wedge-shaped piece, $x$, which slides on the guide-plate V⁴.

The method of working the machine is as follows: The operator, having selected the proper size of inserter and anchor-stamp and adjusted the machine generally according to the work it is required to perform, places a packet of bristles upon the table S, cuts off a layer therefrom, and turns the endless comb T⁵ until the layer of bristles comes within reach of the comb U. Having seen that the fiber-feeding and anchor-stamping mechanism is in proper order, he fits a hole in the previously-drilled brush-board upon the nozzle of the inserter-tube Q. He then places his foot on the treadle J, setting the entire machine in motion. The abutment-plate R sustains the pressure during the insertion of the tuft, the operator directing his attention merely to the fitting of the brush-board until the layer of fibers is exhausted or the machine is stopped through some obstruction in the feed of the anchor metal. As the inserter-tube advances, it encounters an anchor previously introduced into the tube through one side, and, pushing the anchor forward, causes the latter to act against the tuft of bristles, which is previously inserted through the opposite side of the tube in such manner as to lie through and across the same in the path of the anchor. As the anchor continues its advance through the tube, it causes the tuft to be doubled or folded over it by the action of the tube and to be carried forward in this doubled condition out of the end of the tube and into the hole or seat in the brush-stock, until finally, when the bristles and the anchor are firmly seated in the stock and can advance no farther, the continued pressure of the blade expands the anchor, so that its toothed edges engage in the walls of the hole. The anchor is thus fastened securely in place, so that it in turn holds the bristles firmly within the stock. The blade being now retracted, another tuft and anchor are fed into the tube and the action repeated.

I claim—

1. In combination with the driving-pulley E, the friction-cone, the cone-operating lever and spring, the arm H, attached to said lever and provided with shoulder $h$, the lever J', provided with shoulder $j$, and the treadle J, connected to lever J'.

2. In combination with the inserter-tube Q, through which the bristles and anchors are delivered to the brush-stock, the reciprocating head or carrier N and the inserter-blade secured to and adjustable longitudinally in reference to said head, whereby the advance of said head in relation to the tube may be changed, as and for the purpose described.

3. In a machine such as described, the inserter-tube Q, constructed in two principal parts, such as $q$ $q'$, with removable wearing parts $q^5$, $q^6$, and $q^7$, held together by pins $q^3$ and sleeve $q^4$, substantially as specified, and shown in the accompanying drawings.

4. In a brush-machine, in combination with the anvil-block L, the two punches, as shown, the first adapted to cut the central notch and the other to give external shape to the anchors, as described.

5. In a machine such as described, the combination, with the abutment-plate R, of the flexible lever $R^6$ $R^7$, pawls $r^6$, engaging with rack $r^8$ and the cam $r^9$, and levers $R^{11}$ and $R^{12}$, for raising the pawls, the whole constructed and operating substantially as specified, and illustrated in Figs. 1, 2, and 5 of the accompanying drawings.

6. In a machine such as described, the trident or apparatus for separating the fibers or bristles into layers, and consisting of a central prong, such as T, to which is imparted only a reciprocating movement in a direction across the path traversed by the bristles, and two outer prongs, such as $t'$ and $t^2$, to which are imparted reciprocating movements both across and in the direction of the path of the bristles, substantially as specified.

7. In a machine such as described, the combination, with the endless chain $T^5$, of a comb, such as U, to which is imparted the reciprocating movements, the one across and the other in the direction of the passage of the bristles or fibers, substantially as specified, and shown in the accompanying drawings.

8. The reciprocating and rocking comb U, in combination with the rod U' and the movable bar $U^6$, having the inclined surface, whereby the cone may be thrown out of its operative position at will.

9. In a machine such as described, the separator V and counter-separator V', in combination with the comb U, adjustable guides $S^6$ and $T^3$, slide $x$, and adjusting-screw $x'$, the whole arranged and operating substantially as and for the purpose specified.

10. In a brush-machine, the combination of the nipping-jaws K and $K^2$, trigger $o^2$, lever $o^3$, spring $O^2$, crank-lever $o$, provided with stud $o'$, and forked rod H, as and for the purpose described.

In witness whereof I have hereto set my hand in the presence of the two subscribing witnesses.

J. V. GANE.

Witnesses:
   ALFRED J. BOULT,
   HARRY B. BRIDGE.